United States Patent
Laskawiec et al.

(10) Patent No.: US 10,922,312 B2
(45) Date of Patent: Feb. 16, 2021

(54) OPTIMIZATION OF DATA PROCESSING JOB EXECUTION USING HASH TREES

(71) Applicant: INTERNATIONAL BUSINESS MACHINES CORPORATION, Armonk, NY (US)

(72) Inventors: Andrzej Laskawiec, Cracow (PL); Michal Bodziony, Tęgoborze (PL); Marcin Filip, Cracow (PL); Lukasz S. Studzienny, Cracow (PL); Marcin Luczynski, Cracow (PL); Monika Piatek, Cracow (PL); Tomasz Zatorski, Cracow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 16/139,472

(22) Filed: Sep. 24, 2018

(65) Prior Publication Data
US 2020/0097585 A1 Mar. 26, 2020

(51) Int. Cl.
G06F 16/2453 (2019.01)
G06F 16/25 (2019.01)
G06F 16/22 (2019.01)

(52) U.S. Cl.
CPC ...... *G06F 16/2453* (2019.01); *G06F 16/2246* (2019.01); *G06F 16/2255* (2019.01); *G06F 16/254* (2019.01)

(58) Field of Classification Search
None
See application file for complete search history.

(56) References Cited

U.S. PATENT DOCUMENTS 8,200,614 B2   6/2012 Syed et al.
8,214,324 B2   6/2012 Joerg et al.
(Continued)

OTHER PUBLICATIONS

Behrend, A., et al., "Optimized Incremental ETL Jobs for Maintaining Data Warehouses", IDEAS '10 Proceedings of the Fourteenth International Database Engineering & Applications Symposium, Aug. 2010, pp. 216-224. Retrieved on Aug. 31, 2018 from Internet URL: <http://citeseerx.ist.psu.edu/viewdoc/download?doi=10.1.1.225.7886&rep=rep1&type=pdf>.

(Continued)

*Primary Examiner* — Giuseppi Giuliani
(74) *Attorney, Agent, or Firm* — William Hartwell; Matthew M. Hulihan; Heslin Rothenberg Farley & Mesiti PC

(57) ABSTRACT

Optimization of job execution includes generating a hash tree for an initial dataset, executing a data processing job against the initial dataset, the job including a set of calculations against data of the records of the initial dataset, generating, based on a modification to the initial dataset to produce a modified dataset, a hash tree for the modified dataset, comparing the hash tree for the initial dataset to the hash tree for the modified dataset, and identifying one or more blocks of the modified dataset that are updated compared to the initial dataset, and re-executing the job against the modified dataset. The re-executing performs only those calculations that use data of the records of the one or more blocks that are updated compared to the initial dataset, and does not perform other calculations that do not use data of the records of the one or more blocks.

20 Claims, 9 Drawing Sheets

(56) References Cited

U.S. PATENT DOCUMENTS

| | | | |
|---|---|---|---|
| 8,543,539 B2* | 9/2013 | Ahluwalia | G06F 16/22 |
| | | | 707/613 |
| 9,529,873 B2 | 12/2016 | Bhide et al. | |
| 9,659,072 B2 | 5/2017 | Gorelik et al. | |
| 2015/0242478 A1* | 8/2015 | Cantwell | G06F 16/27 |
| | | | 707/634 |
| 2016/0314176 A1 | 10/2016 | Dhayapule et al. | |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

OPTIMIZATION OF DATA PROCESSING JOB EXECUTION USING HASH TREES

BACKGROUND

An 'Extract, Transform, Load' (ETL) methodology extracts data from one or more sources, transforms the data, for instance into a proper structure, format, or desired results, and stores ("loads") the transformed data into a target for later access. ETL processes, commonly referred to as jobs, are implemented by systems and/or programs typically referred to as ETL tools, an example of which is the IBM Infosphere® Information Server offered by International Business Machines Corporation, Armonk, N.Y., U.S.A. (of which INFOSPHERE is a registered trademark). An ETL tool is an example type of data integration tool, and an ETL job performed by an ETL tool is an example process for data integration. Data processing jobs, such as ETL jobs, can process large datasets and it may be desired that these jobs be executed ("ran") periodically.

SUMMARY

In the case of a large job involving a lot of data or computations on that data, each execution, for instance to re-run the job after the subject dataset is modified, can take a significant amount of time to process the entire dataset. If the percentage of data modified since the last run is relatively small and only a small percentage of the result values of the processing change, re-running the job to perform the computations against the entire dataset is inefficient and consumes more resources, such as time, power, or money, than necessary.

Shortcomings of the prior art are overcome and additional advantages are provided through the provision of a computer-implemented method. The method generates a hash tree for an initial dataset. The generation of the hash tree uses computed hashes of records of the initial dataset, the records of the initial dataset assigned to blocks of the initial dataset. The method executes a data processing job against the initial dataset, the data processing job including a set of calculations against data of the records of the initial dataset. The method generates, based on a modification to the initial dataset to produce a modified dataset, a hash tree for the modified dataset using computed hashes of records of the modified dataset, the records of the modified dataset assigned to blocks of the modified dataset. The method compares the hash tree for the initial dataset to the hash tree for the modified dataset, and identifies, based on the comparing, one or more blocks of the modified dataset that are updated compared to the initial dataset. The method also re-executes the data processing job against the modified dataset. The re-executing performs only those calculations, of the set of calculations, that use data of the records of the identified one or more blocks that are updated compared to the initial dataset, and does not perform other calculations, of the set of calculations, that do not use data of the records of the one or more blocks.

Further, a computer system is provided that includes a memory and a processor in communication with the memory, wherein the computer system is configured to perform a method. The method generates a hash tree for an initial dataset. The generation of the hash tree uses computed hashes of records of the initial dataset, the records of the initial dataset assigned to blocks of the initial dataset. The method executes a data processing job against the initial dataset, the data processing job including a set of calculations against data of the records of the initial dataset. The method generates, based on a modification to the initial dataset to produce a modified dataset, a hash tree for the modified dataset using computed hashes of records of the modified dataset, the records of the modified dataset assigned to blocks of the modified dataset. The method compares the hash tree for the initial dataset to the hash tree for the modified dataset, and identifies, based on the comparing, one or more blocks of the modified dataset that are updated compared to the initial dataset. The method also re-executes the data processing job against the modified dataset. The re-executing performs only those calculations, of the set of calculations, that use data of the records of the identified one or more blocks that are updated compared to the initial dataset, and does not perform other calculations, of the set of calculations, that do not use data of the records of the one or more blocks.

Yet further, a computer program product including a computer readable storage medium readable by a processing circuit and storing instructions for execution by the processing circuit is provided for performing a method. The method generates a hash tree for an initial dataset. The generation of the hash tree uses computed hashes of records of the initial dataset, the records of the initial dataset assigned to blocks of the initial dataset. The method executes a data processing job against the initial dataset, the data processing job including a set of calculations against data of the records of the initial dataset. The method generates, based on a modification to the initial dataset to produce a modified dataset, a hash tree for the modified dataset using computed hashes of records of the modified dataset, the records of the modified dataset assigned to blocks of the modified dataset. The method compares the hash tree for the initial dataset to the hash tree for the modified dataset, and identifies, based on the comparing, one or more blocks of the modified dataset that are updated compared to the initial dataset. The method also re-executes the data processing job against the modified dataset. The re-executing performs only those calculations, of the set of calculations, that use data of the records of the identified one or more blocks that are updated compared to the initial dataset, and does not perform other calculations, of the set of calculations, that do not use data of the records of the one or more blocks.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for efficiently re-executing data processing jobs after the underlying dataset has been modified. In general, aspects described herein provide that, when executing a data processing job such as an Infosphere® Information Server job, a hash tree for the dataset is generated and stored. An example type of hash tree is a Merkle tree. When the job is to be re-executed, for instance at a later time after modifications have been made to the dataset, a new hash tree, for the modified dataset, is generated and compared to the previous hash tree for the initial dataset. The comparison identifies portions of the dataset that include modified (updated, added, removed) records. The portions can be 'blocks' of one or more records each. The job processing for the re-execution can therefore be limited to processing of only those blocks that include modified data, for instance changed, added, or deleted records.

Figure 1:
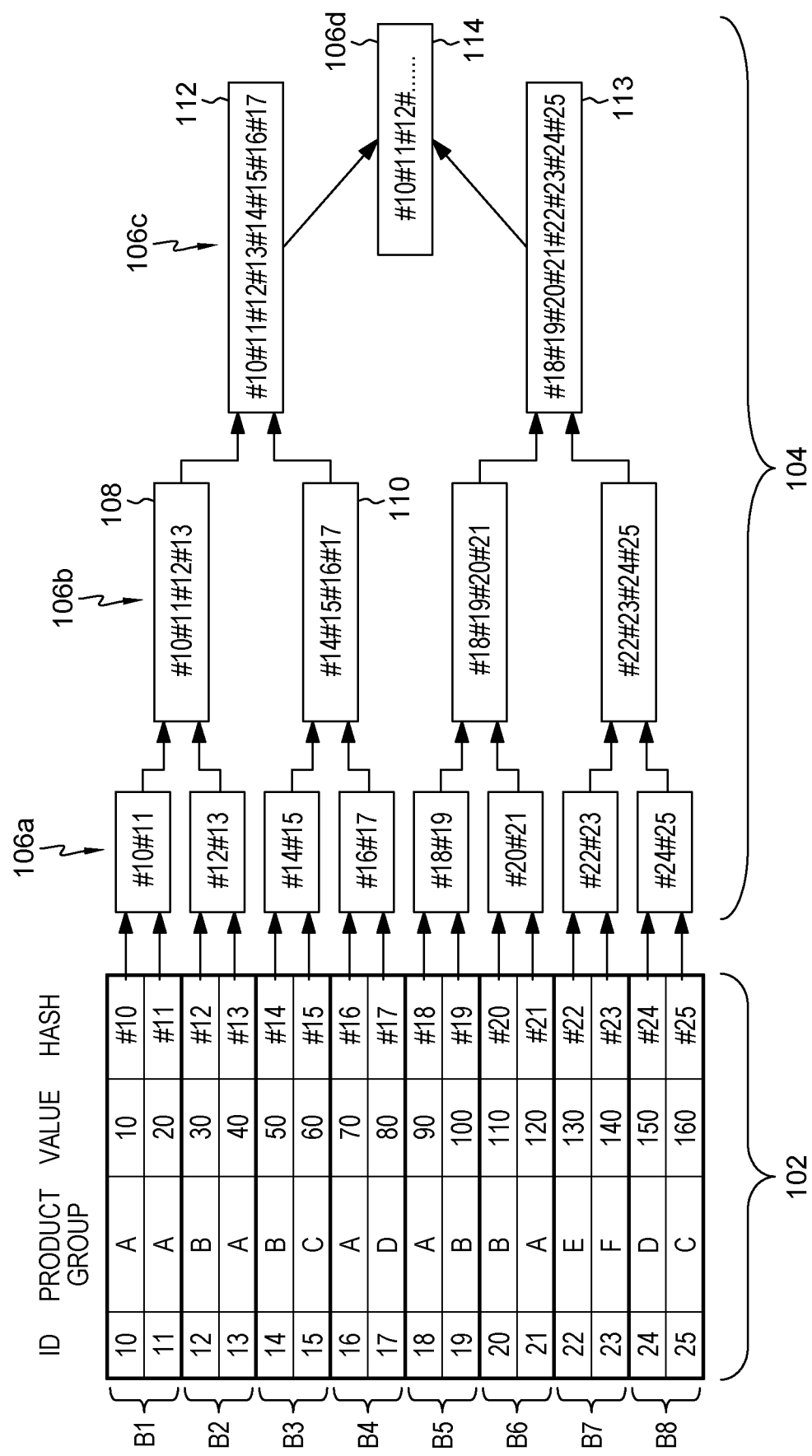
FIG. 1 depicts an example initial dataset and corresponding hash tree, in accordance with aspects described herein.

By way of specific example, assume the data processing job reads invoice data from a table, filters invoice position by specific product groups, and then calculates aggregations of items sold in each product group and average invoice position value. FIG. 1 depicts an example initial dataset and corresponding hash tree, in accordance with aspects described herein.

In FIG. 1, 102 includes the initial dataset, having 16 records (ID 10 through 25), each record having the identifier (in ID column), a product group identifier (in Product Group column), and value (in Value column). A hash is computed for each record and placed in the Hash column of table 102. In this example, the hash value for a record is of the form #record_ID, though the hash could be calculated by any hash function or in any way desired. More typically, the hash function to calculate the hashes could account for any record attribute that may change. In particular examples, the hash value for each record is based on (e.g. a function of) each attribute/column of the record, to help ensure that any change to the record would be seen as a modification to the dataset, as described herein.

The records of the dataset are assigned to blocks (B1 through B8 here) and each such block is, in this example, assigned a respective pair of different records of the initial dataset. In this manner, the original table is partitioned into blocks of two records each.

Hash tree 104, a multi-level Merkle tree in this example, is generated for this dataset. The generating uses the computed hashes of the records of the initial dataset, i.e. the hash values in the Hash column. The value at each node of the hash tree is in this example a concatenation of hash values of records of the initial dataset. The hash tree 104 is a binary tree, and each parent node has a hash value that is a concatenation of the hash values of its child/children nodes.

Here, at the leaf node level (106a) of the hash tree 014, a hash value is calculated for each block B1 through B8 as a concatenation of the hash values of each constituent record of the block. Thus, the leaf node corresponding to block B1 has a value #10 #11, which is a concatenation of the hash values (from Hash column) for record 10 and record 11, the records of block B1.

Each node at the next level 106b of the hash tree has hash values that are a concatenation of the hash values from its two child nodes. Thus, node 108 has a hash value that is the concatenation of the hash values of the leaf nodes corresponding to Blocks B1 and B2. Similarly, a next level 106c is a higher level of parent nodes. The hash value of parent node 112 at level 106c is a concatenation of the hash values of child nodes 108 and 110 at level 106b. Finally, here, the hash value (not shown in its entirety in FIG. 1) of root node 114 is a concatenation of the hash values of its two child nodes, 112 and 113.

Figure 2:
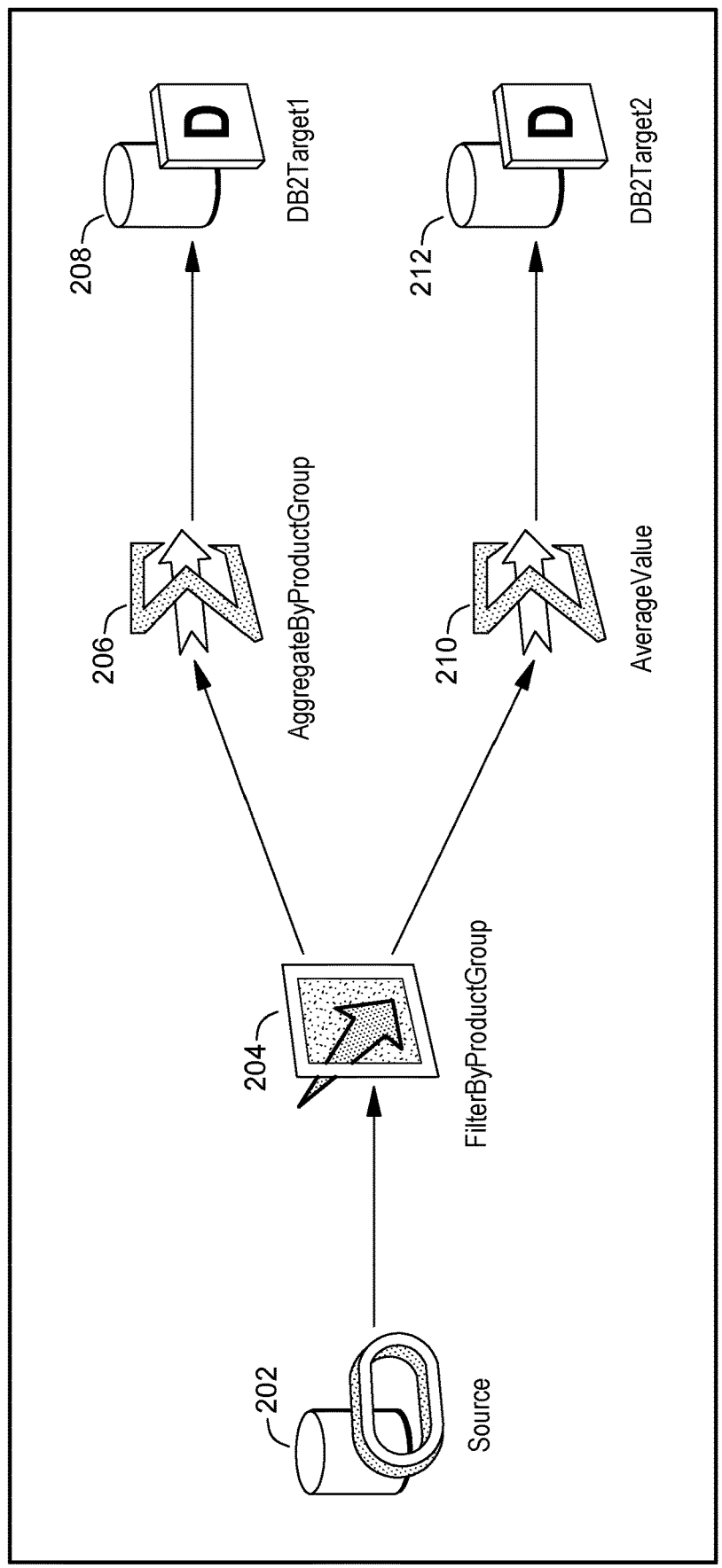
FIG. 2 depicts an example data processing job.

FIG. 2 depicts an example data processing job to be performed on the dataset included in FIG. 1. In this job, an extraction happens from the source database 202. A transformation includes filtering 204 by product group, aggregation 206 by product group, and determining 210 average value. Loading the results of 206 stores the results to the target database 208 and loading the results of 210 stores the results to the target 212.

Figure 3:
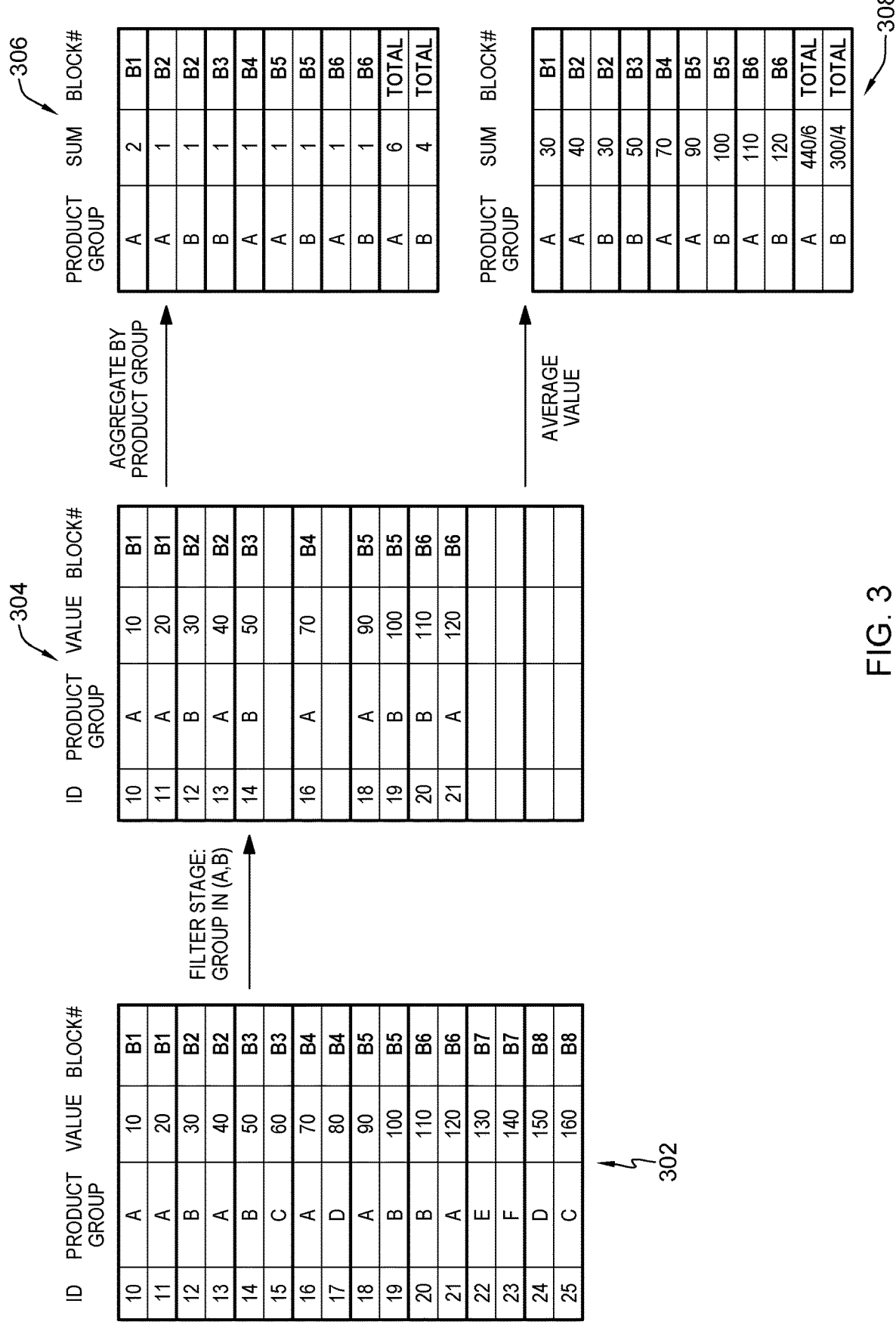
FIG. 3 depicts example tables used and produced in the execution of the data processing job of FIG. 2 against the initial dataset of FIG. 1, in accordance with aspects described herein.

FIG. 3 depicts example tables used and produced in the execution of the data processing job of FIG. 2 against the initial dataset of FIG. 1, in accordance with aspects described herein. Here, the source data is processed in blocks, and for the transformation stages, some additional data (in the form of tables) is stored. Some data in tables 304, 306, 308 are result values of the processing. The result values are associated with block identifiers/indicators (in Block #column). The hash tree (FIG. 2) and tables of FIG. 3 can be stored and maintained. The tables can be used in job re-execution after dataset modifications as described herein.

Table 302 includes records ID 10 through 25, and for each entry a respective block indicator (the Block #column). The filter by product group processing (204) filters only products in product group A and B, producing table 304 that includes some intermediate result values. It is seen that records 15, 17, and 22-25 are dropped by the filtering because they are for products not in group A or B. The aggregate by product group action (206) produces table 306, which indicates for each block represented in table 304 (blocks B1 through B6 here) the product group(s) represented by the filtered records in that block, as well as the sum number of such records for products of that product group in the group. Thus, in table 304, block B1 includes records 10 and 11, both for product group A. Therefore, table 306 indicates in its first record that product group A is represented in two records (Sum=2) in block B1. Since block B2 includes a record for product group A and a record for product group B, the Sum column for block B2 indicates one of each. The last two rows of table 306 are sums of the records of product group A and records of product group B across all block (B1 through B6) represented in table 304. Thus, across all blocks represented in table 304, 6 products in group A and 4 products in group B are represented.

The average value action (210) produces table 308 which indicates, for each block represented in table 304 (blocks B1 through B6 here), the sum of the Value column data values for the records, by product group (A and B). In block B1, the sum of the values in the value column for product in group A is 30. No products of group B exist in block B1 as this point, so table 308 does not include an entry for product group B from block B1. The last two rows of table 308 are the average value by product group (represented as total sum across all blocks divided by the number of records for each product group, taken from table 306).

Accordingly, a data processing job can be executed against an initial dataset (FIG. 1, 102). The data processing job includes a set of calculations against data of the records of the initial dataset (example calculations are summations and averages done as explained with reference to FIG. 3). Tables (e.g. 304, 306, 308) are obtained based on that execution of the data processing job against the initial dataset, and these tables store result values of the data processing job. The result values can each be associated with a respective block of the initial dataset. The association is indicated by the Block #column in the tables of FIG. 3.

Based on a modification to the initial dataset to produce a modified dataset, a hash tree as described above can be generated for the modified dataset using computed hashes of records of the modified dataset. The records of the modified dataset can also be assigned to 'blocks', e.g. of the modified dataset. Example modification(s) to the initial dataset can each be: an update to a record of the initial dataset, a removal of a record of the initial dataset, or an addition of a record to the initial dataset, as examples. In other words, if a data value of a record in the initial dataset is changed, this is considered a modification to the initial dataset. So too is the addition of a new record to the initial dataset or deletion of a record from that dataset.

After update/modification to the initial dataset, for instance in these examples a modification to a value in the source table, a new hash tree is generated for the modified dataset and this can be used to determine which blocks were modified, i.e. which blocks have a data record that was changed, added, or removed. A modified block could be one that existed with the initial dataset or one added because of added records when the initial dataset is modified.

Generally, as described herein, the determination of which block(s) were modified is done by comparing the hash tree for the initial dataset to the hash tree for the modified dataset. This identifies one or more blocks of the modified dataset that are updated compared to the initial dataset. As noted, a block may be identified as updated if (i) a respective record of the block in the modified dataset (for instance a record in block B6) has a changed data value as compared to the record in the initial dataset, (ii) a respective record of the block (e.g. B6) in the initial dataset is removed from the block (B6) in the modified dataset, (iii) a respective record is added to the block (B6) in the modified dataset as compared to the block (B6) in the initial dataset, or the block (B6) is not in the initial dataset to begin with, as examples.

Figure 4:
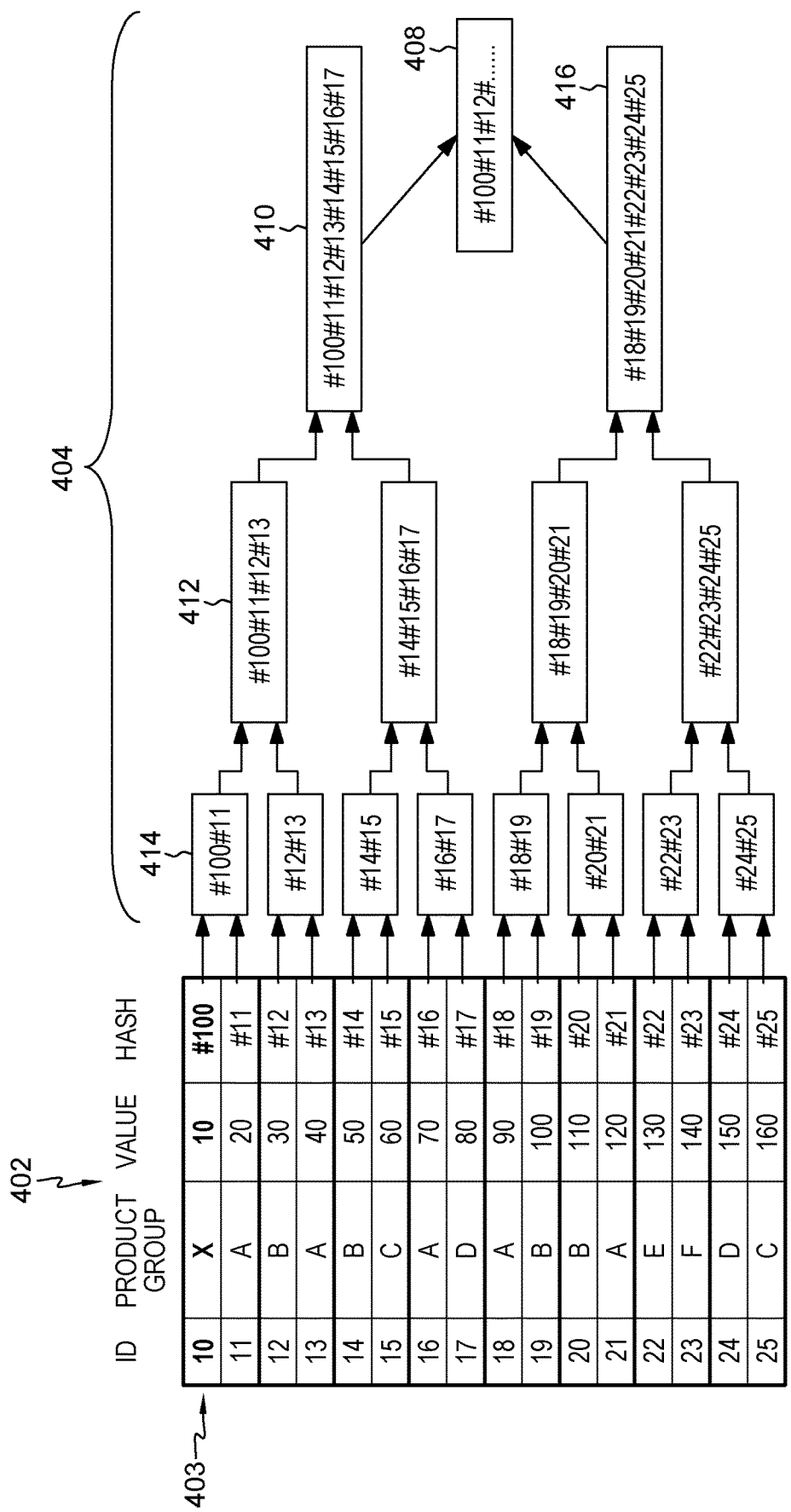
FIG. 4 depicts an example modified dataset and corresponding hash tree, in accordance with aspects described herein.

To illustrate, FIG. 4 depicts an example modified dataset (402) and corresponding hash tree (404), in accordance with aspects described herein. In this case, block B1 of the initial dataset has been modified/updated, and specifically, a change has been made to the record 403 (ID 10), where the product for record 10 has been regrouped to product group X (from product group A). Hash tree 404 is generated as described above, by concatenating hash values. Here too, each leaf node of the hash tree 404 for the modified dataset corresponds to a respective block of the modified dataset. Block B1 of the modified dataset can again include records 10 and 11, B2 records 12 and 13, and so on.

The modification made to record 403 causes the hash value for the record to change, in this case from #10 to #100. Consequently, the generated hash tree for this modified dataset is built and differs from the hash tree previously built (104 of FIG. 1). Specifically, nodes 414, 412, 410, and 408 all include the new hash value #100. Consequently, a comparison between the updated hash tree 404 and the initial hash tree 104 reveals differences between corresponding nodes. In other words, a pairwise comparison is performed between nodes of the trees. When the root nodes are compared, it is seen that their hash values differ, in this example on account of the hash of record 403 changing. Initially, this mismatch between the root nodes informs that some modification of the dataset has occurred. The child node(s) of the root nodes of the hash trees are then pairwise compared—the hash value of node 410 is compared to the hash value of node 112, and the hash value of node 416 is compared to the hash value of node 113. The comparison of 416 to 113 reveals a match. This informs that there was no modification of any of the last half of the blocks in the dataset. Further processing of the nodes of the subtree extending down from node 416 to its leaves can be omitted because their hash values do not differ.

However, the comparison of node 410 to 112 reveals a mismatch. This informs that some block associated with the sub-tree of node 112 has changed. More specifically, it informs that some leaf of the subtree (which leaf corresponds to a block) has a hash value that has changed as a result of the modification made to the initial dataset. Iterating the comparison process described above eventually identifies leaf node 414 as having the changed hash value. This informs that block B1 has changed, specifically that a record of B1 has been updated, added, or removed in comparison to the initial dataset.

The hash tree comparison thus identifies which blocks have been modified or added. The comparison starts at the root nodes and reveals differences between pairs of nodes (one form each tree) that correlate to each other. If it is determined by the node comparison that something was modified (i.e. the hash values of the two nodes differ), the comparison moves a level lower in the trees and continues. Eventually, the comparison makes its way to any leaf node(s) that have a changed hash value as compared to the prior hash tree. Leaf nodes of the hash tree for the modified dataset which do not have a corresponding leaf node in the hash tree for the initial dataset informs that records that have been added, and therefore the corresponding blocks in the modified dataset should be considered modified. This identifies changed and added blocks, and therefore changed and added entry/entries in the table (402). In the example of FIG. 1, there is only one change to one record in the dataset.

In this manner, the process can iteratively compare hash values of nodes of the hash tree for the modified dataset to hash values of nodes of the hash tree for the initial dataset. A match between hash values of a first node (i.e. of the hash tree for the modified dataset) and hash values of a second node (i.e. of the hash tree for the initial dataset) indicates that a set of blocks of the modified dataset that are associated with a sub-tree of the first node are unmodified as compared to a set of blocks of the initial dataset that are associated with a sub-tree of the second node, and therefore the set of blocks of the modified dataset are not updated compared to the set of blocks of the initial dataset. This is illustrated in FIG. 4 where, because the hash value of node 416 does not differ from that of node 113, this indicates that the blocks B5 through B8 (those associated with the subtree beneath node 416) have not been changed.

If instead there is a mismatch between hash values of a node of the hash tree for the modified dataset and hash values of a node of the hash tree for the initial dataset, this indicates that at least one block, of the modified dataset, that is associated with a sub-tree of the node in the hash tree for the modified dataset, is updated as compared to the initial dataset. This is illustrated in FIG. 4 where, because the hash value of node 410 does not match that of node 112, this indicates that at least one of blocks B1 through B4 (associated with the subtree beneath node 410) have been updated.

Because it can be identified which blocks have been modified, then when re-executing the data processing job at a desired time, the processing/calculations to be performed can be limited to that processing of the modified blocks. In other words, re-executing the data processing job against the modified dataset can perform only those calculations, of the set of calculations of the job, that use data of the records of the identified one or more blocks that are updated compared to the initial dataset, and need not perform other calculations, of the set of calculations, that do not use data of the records of the one or more blocks. Because of this, significant efficiencies and resource savings are gained as compared to convention job re-execution that executed the job again even unmodified data.

Figure 5:
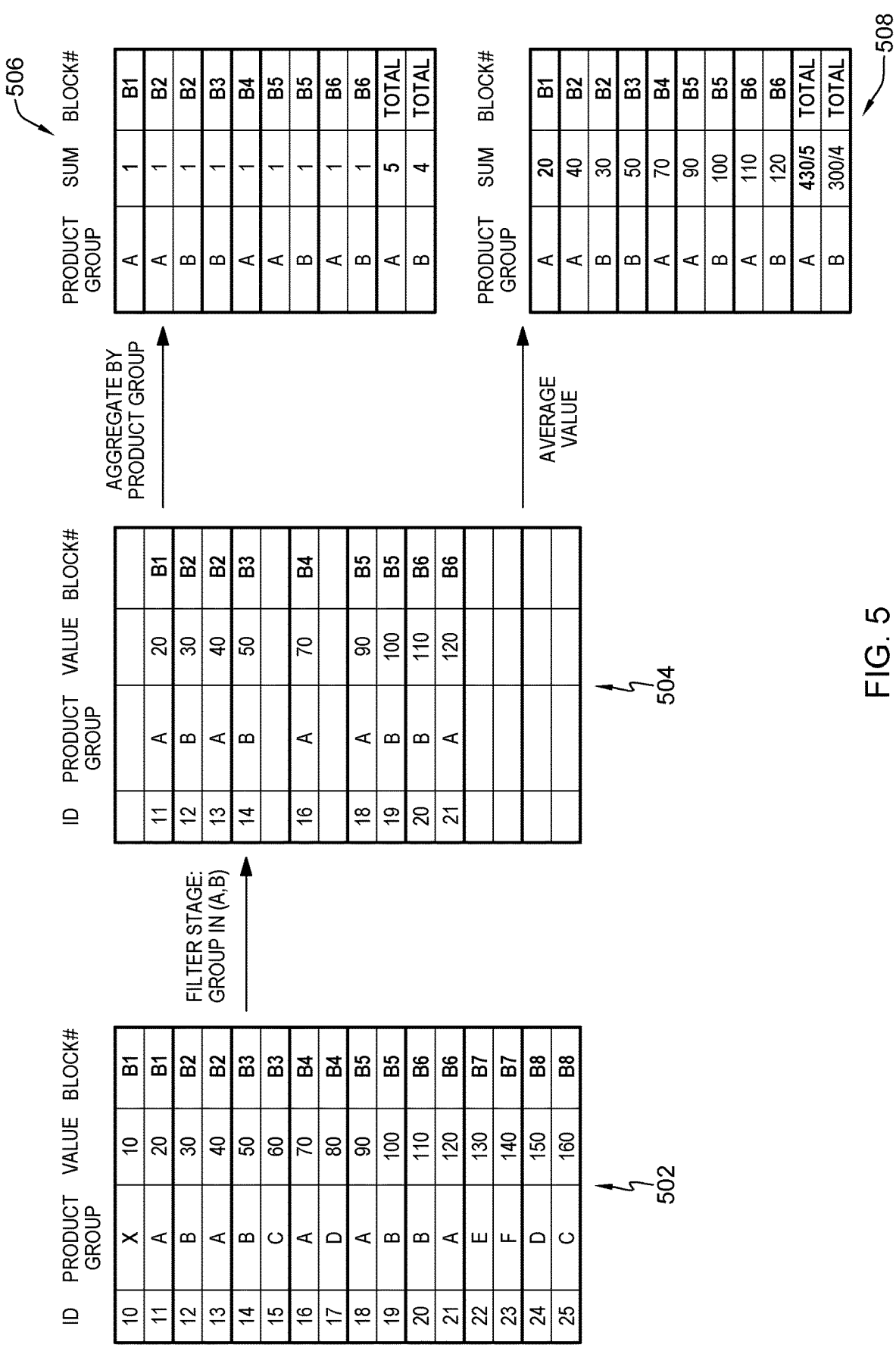
FIG. 5 depicts example tables used and produced in the re-execution of the data processing job of FIG. 2 against the modified dataset of FIG. 4, in accordance with aspects described herein.

FIG. 5 depicts example tables used and produced in the re-execution of the data processing job of FIG. 2 against the modified dataset of FIG. 4, in accordance with aspects described herein. The tables of FIG. 5 are near identical to those of FIG. 3 except that the update to record ID 10 has been reflected in table 502, i.e. the product for record 10 has been reassigned to product group X from product group A, and the appropriate calculations performed with results saved to tables 504, 506 and 508. The block assignments (shown by Block #) for the modified dataset remain blocks B1 through B8. The filter by product group action (204 of FIG. 2) filters only products in product groups A and B, producing table 504 and it is seen that record ID 10 is filtered out.

The impact this has on the aggregate by product group action (206 of FIG. 2) is that it reduces the sum of products in product group A represented in block B1 from 2 to 1. That in turn reduces the total sum of products in product group A across blocks B1 through B8 from 6 to 5. Since only block B1 was modified, this gives the opportunity to perform only the calculations using data from record(s) of block B1. Calculations not using data from records of block B1 may be avoided/omitted on the basis that the underlying data of those blocks did not change and therefore the calculations (at least those not relying on any other external data that may have changed, for instance time/date of job execution) would produce the same results already previously calculated and stored. Therefore, the calculations to calculate sum for product groups A and B in blocks B2 through B8 are avoided. Since the sum for product A across all blocks B1 through B8 uses the sum for block B1, this calculation is performed and its result value updated from 6 to 5.

Similarly, the impact of the change to record ID 10 on the average value action (210 of FIG. 2) is that it reduces the sum of products in product group A represented in block B1 from 30 to 20, and therefore affects the overall average (updated as 430 divided by 5) across all of the blocks. Consequently, only the calculations for sum of product group A in block B1 and the total average (430/5) for product group A across all blocks need to be performed, and the other calculations in the average value action need not be performed.

The tables 504, 506, 508 may be the tables as tables 304, 306, 308 respectively (or copies of those tables) except updated with updated result values for the calculations that were performed during the re-execution. Thus, to form table 506, for instance, table 306 (or a copy thereof) may simply be updated in only the two places of the Sum column for which calculations were performed. Alternatively, the tables 504, 506, 508 could be newly instantiated data structures which are populated with data from prior tables 304, 306, 308, respectively, except with updated calculations performed for those values that are or may be affected by the modifications that were made.

It is therefore seen that because only block B1 was updated, only the processing to calculate new values from data of block 1 needs to be performed when re-running the job.

The result values (e.g. data values in the tables) to update based on the re-executing can therefore be identified by their respective block indicator indicating one of the one or more blocks of the modified dataset that are updated compared to initial dataset. For instance, the tables 304/504,306/506, 308/508 includes Block #columns to identify the pertinent block of the modified dataset. Since only B1 was modified, the values with their block #indicating block B1 can be updated. Additionally, in this example, some result values (such as total sums and total average values at the bottom of tables 506, 508) are dependent on other changed result values that emanate from data of a modified block. Therefore, these results values can be marked for updating too, on the basis that that their values depend on other changed values. The re-executing the data processing job therefore updates, in the one or more tables, result values associated with the one or more blocks of the modified dataset that are updated compared to initial dataset (i.e. the result values that are associated with, for instance dependent upon, the data in block B1).

Additionally or alternatively, aspects described herein can also apply for join stages of data processing jobs, in which data is joined and loaded to a target. In these situations, the same approaches can be taken to identifying which data in the datasets being joined were modified. Then, processing the job can perform those computations (as part of the join stage) that use the modified data, while refraining from performing join operations that do not involve modified data.

In some examples, aspects described herein are applied to data processing jobs with computationally-intensive and/or time-consuming processing. Significant resource savings can result in these cases, even if the hash tree generation itself takes a relatively long amount of time (several minutes for instance). This can be much faster and less resource-intensive than a job that takes hours or days.

Figure 6:
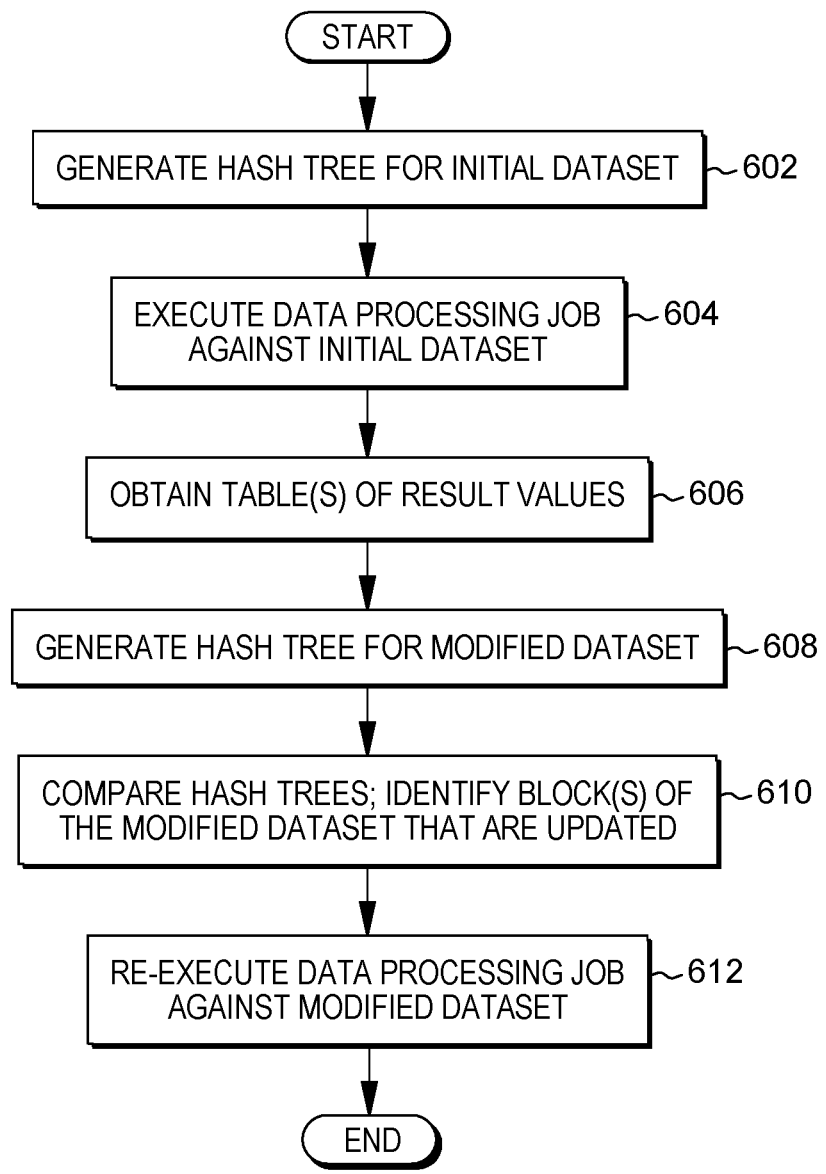
FIG. 6 depicts an example process for optimization of data processing job execution using hash trees, in accordance with aspects described herein.

FIG. 6 depicts an example process for optimization of data processing job execution using hash trees, in accordance with aspects described herein. In some examples, the process is performed by one or more computer systems, such as those described herein, which may include one or more computer systems performing data processing jobs, such as and IBM Infosphere® Information Server, and/or one or more other computer systems.

The process begins by generating (602) a hash tree for an initial dataset. The generating uses computed hashes of records of the initial dataset, the records of the initial dataset being assigned to blocks of the initial dataset. In some examples, the first hash tree is a Merkle tree. Each leaf node of the hash tree for the initial dataset can correspond to a respective block of the initial dataset. In examples, each block of the blocks of the initial dataset is assigned a respective plurality of different records of the initial dataset.

The process continues by executing (604) a data processing job against the initial dataset. The data processing job includes a set of calculations against data of the records of the initial dataset. The process obtains (606), based on the executing the data processing job against the initial dataset, one or more tables that store result values of the data processing job. The result values can each be associated with a respective block of the initial dataset. Based on a modification to the initial dataset to produce a modified dataset, the process generates (608) a hash tree for the modified dataset using computed hashes of records of the modified dataset. The records of the modified dataset are assigned to blocks of the modified dataset. In examples, the second hash tree is a Merkle tree, and each leaf node of the hash tree for the modified dataset corresponds to a respective block of the modified dataset.

The modification to the initial dataset can include an update to a record of the initial dataset, a removal of a record of the initial dataset, and/or an addition of a record to the initial dataset, as examples.

The process compares (610) the hash tree for the initial dataset to the hash tree for the modified dataset, and identifies, based on the comparing, one or more blocks of the modified dataset that are updated compared to the initial dataset. Each block of the one or more blocks can be identified as updated based on (i) a respective record of the block having a changed data value as compared to the record in the initial dataset, (ii) a respective record appearing in the block in the initial dataset being removed from the block in the modified dataset, (iii) a respective record being added to the block in the modified dataset as compared to the block in the initial dataset, and/or (iv) the block not being in the initial dataset.

In particular embodiments, the comparing includes iteratively comparing hash values of nodes of the hash tree for the modified dataset to hash values of nodes of the hash tree for the initial dataset. A match between hash values of a first node, of the hash tree for the modified dataset, and hash values of a second node, of the hash tree for the initial dataset, indicates that a set of blocks, of the modified dataset, associated with a sub-tree of the first node are unmodified as compared to a set of blocks, of the initial dataset, associated with a sub-tree of the second node, and therefore the set of blocks of the modified dataset are not updated compared to the set of blocks of the initial dataset. A mismatch between hash values of a third node, of the hash tree for the modified dataset, and hash values of a fourth node, of the hash tree for the initial dataset, indicates that at least one block, of the modified dataset, associated with a sub-tree of the third node is updated as compared to the initial dataset.

Further, the process of FIG. 6 re-executes (612) the data processing job against the modified dataset. The re-executing can perform only those calculations, of the set of calculations, that use data of the records of the identified one or more blocks that are updated compared to the initial dataset, and may not perform other calculations, of the set of calculations, that do not use data of the records of the one or more blocks. In particular embodiments, the re-executing the data processing job updates, in the one or more tables, result values associated with the one or more blocks of the modified dataset that are updated compared to initial dataset. The one or more tables can store a respective block indicator for each result value of the results values, and the result values to update based on the re-executing can be identified by their respective block indicator indicating one of the one or more blocks of the modified dataset that are updated compared to initial dataset.

Although various examples are provided, variations are possible without departing from a spirit of the claimed aspects.

Figure 7:
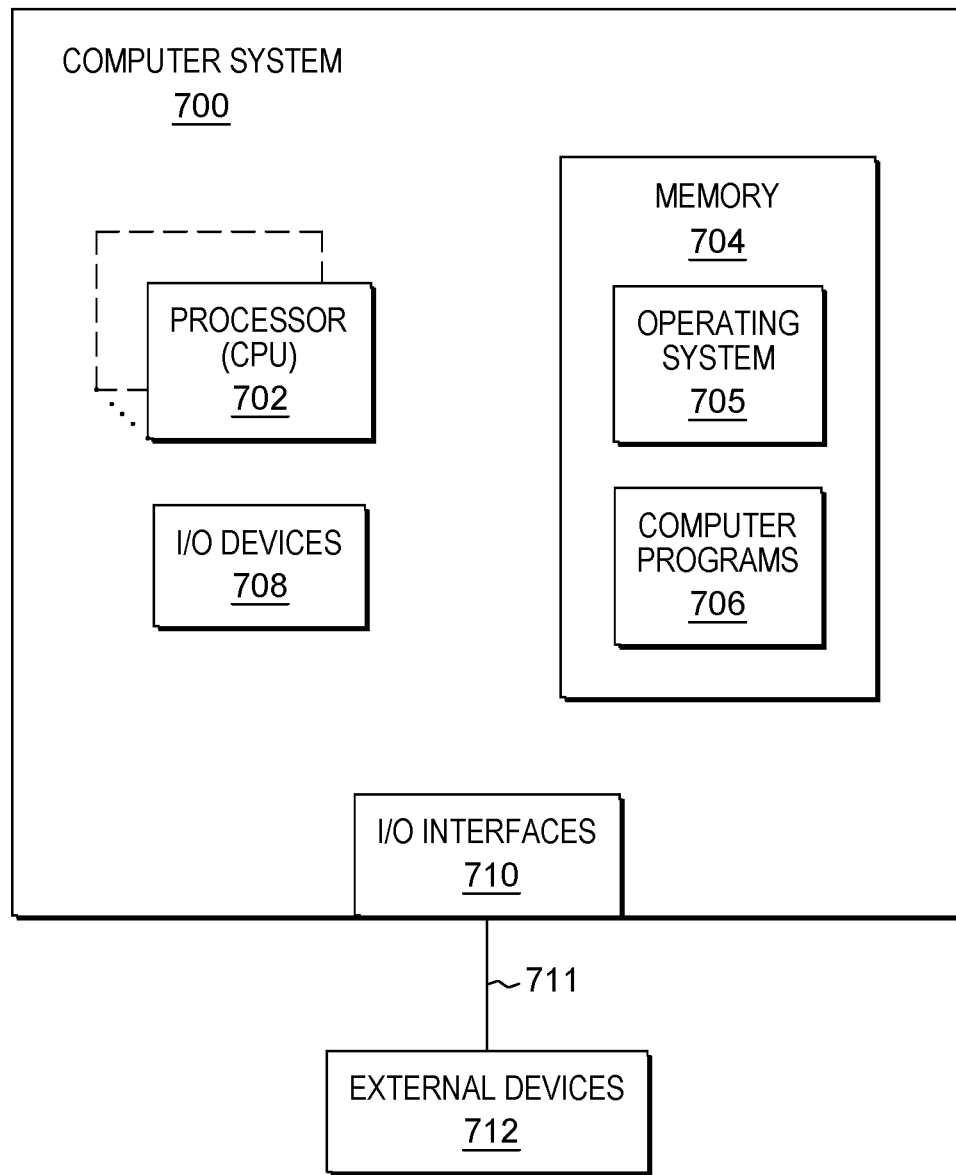
FIG. 7 depicts one example of a computer system and associated devices to incorporate and/or use aspects described herein.

Processes described herein may be performed singly or collectively by one or more computer systems, such as one or more data processing job servers, as an example. FIG. 7 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 7 shows a computer system 700 in communication with external device(s) 712. Computer system 700 includes one or more processor(s) 702, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 702 can also include register(s) to be used by one or more of the functional components. Computer system 700 also includes memory 704, input/output (I/O) devices 708, and I/O interfaces 710, which may be coupled to processor(s) 702 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 704 can be or include main or system memory (e.g. Random Access Memory) used in the execution of program instructions, storage device(s) such as hard drive(s), flash media, or optical media as examples, and/or cache memory, as examples. Memory 704 can include, for instance, a cache, such as a shared cache, which may be coupled to local caches (examples include L1 cache, L2 cache, etc.) of processor(s) 702. Additionally, memory 704 may be or include at least one computer program product having a set (e.g., at least one) of program modules, instructions, code or the like that is/are configured to carry out functions of embodiments described herein when executed by one or more processors.

Memory 704 can store an operating system 705 and other computer programs 706, such as one or more computer programs/applications that execute to perform aspects described herein. Specifically, programs/applications can include computer readable program instructions that may be configured to carry out functions of embodiments of aspects described herein.

Examples of I/O devices 708 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (712) coupled to the computer system through one or more I/O interfaces 710.

Computer system 700 may communicate with one or more external devices 712 via one or more I/O interfaces 710. Example external devices include a keyboard, a pointing device, a display, and/or any other devices that enable a user to interact with computer system 700. Other example external devices include any device that enables computer system 700 to communicate with one or more other computing systems or peripheral devices such as a printer. A network interface/adapter is an example I/O interface that enables computer system 700 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 710 and external devices 712 can occur across wired and/or wireless communications link(s) 711, such as Ethernet-based wired or wireless connections. Example wireless connections include cellular, Wi-Fi, Bluetooth®, proximity-based, near-field, or other types of wireless connections. More generally, communications link(s) 711 may be any appropriate wireless and/or wired communication link(s) for communicating data.

Particular external device(s) 712 may include one or more data storage devices, which may store one or more programs, one or more computer readable program instructions, and/or data, etc. Computer system 700 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 700 may be operational with numerous other general purpose or special purpose computing system environments or configurations. Computer system 700 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
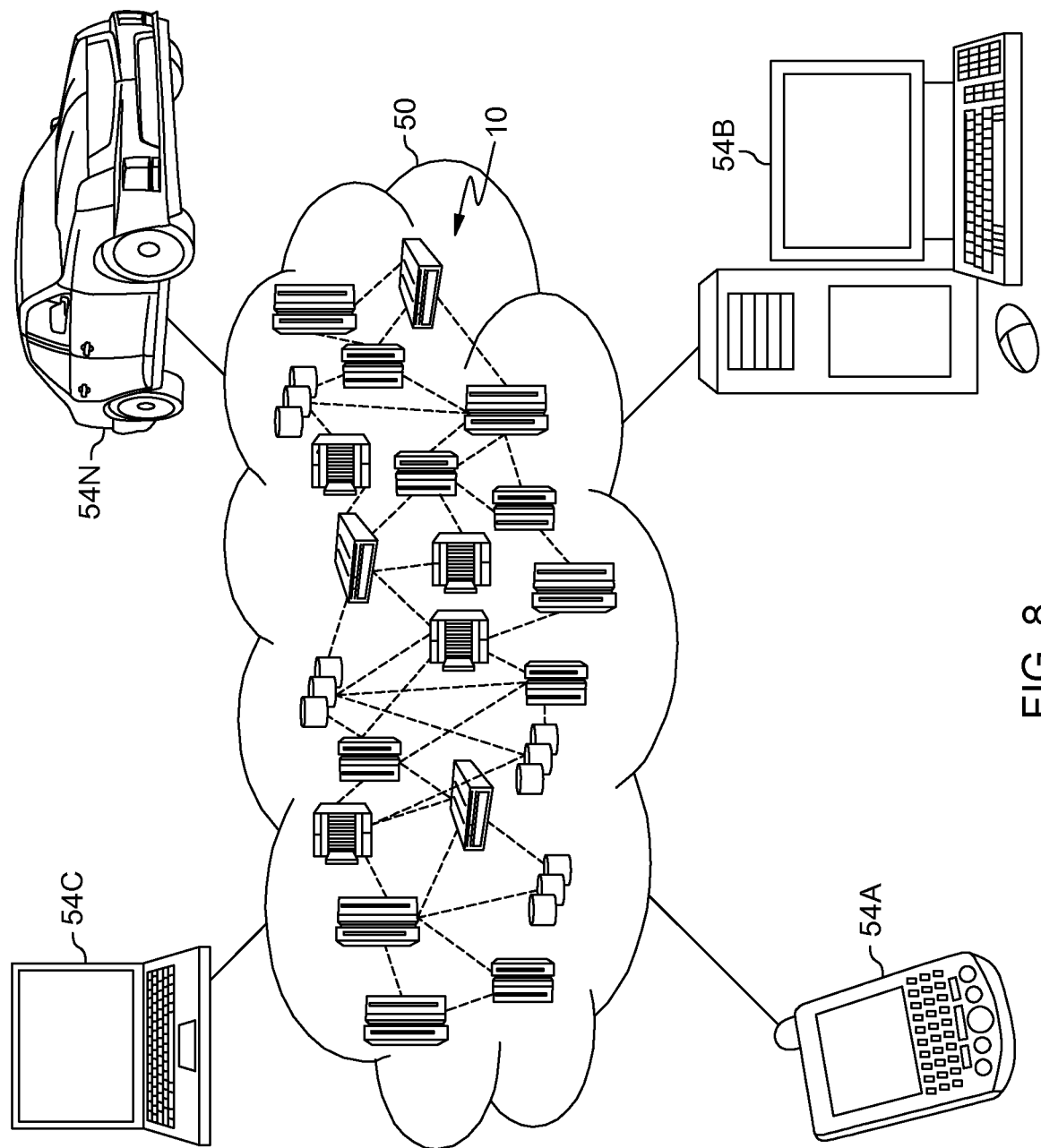
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
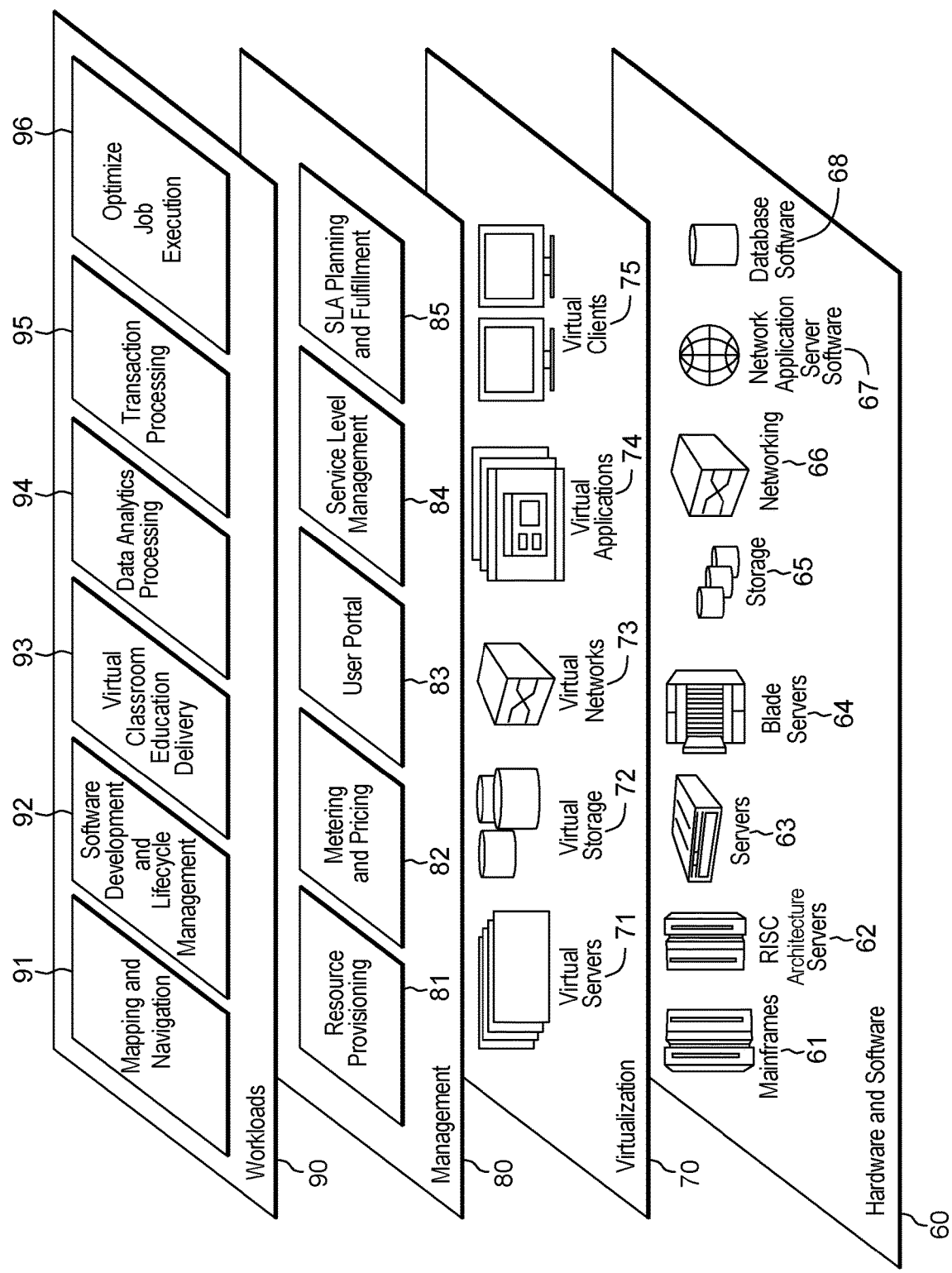
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and job processing optimization 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
generating a hash tree for an initial dataset, the generating using computed hashes of records of the initial dataset, the records of the initial dataset assigned to blocks of the initial dataset;
executing a data processing job against the initial dataset, the data processing job comprising a set of calculations against data of the records of the initial dataset;
based on a modification to the initial dataset to produce a modified dataset, generating a hash tree for the modified dataset using computed hashes of records of the modified dataset, the records of the modified dataset assigned to blocks of the modified dataset;
comparing the hash tree for the initial dataset to the hash tree for the modified dataset, and identifying, based on the comparing, one or more blocks of the modified dataset that are updated compared to the initial dataset; and
re-executing the data processing job against the modified dataset, wherein the re-executing performs only those calculations, of the set of calculations, that use data of the records of the identified one or more blocks that are updated compared to the initial dataset, and does not perform other calculations, of the set of calculations, that do not use data of the records of the one or more blocks.

2. The method of claim 1, wherein the first hash tree and the second hash tree are Merkle trees.

3. The method of claim 1, wherein each block of the blocks of the initial dataset is assigned a respective plurality of different records of the initial dataset.

4. The method of claim 1, wherein the modification to the initial dataset comprises at least one selected from the group consisting of: an update to a record of the initial dataset, a removal of a record of the initial dataset, and an addition of a record to the initial dataset, and wherein each block of the one or more blocks is identified as updated based on at least one selected from the group consisting of: a respective record of the block having a changed data value as compared to the record in the initial dataset, a respective record appearing in the block in the initial dataset being removed from the block in the modified dataset, a respective record being added to the block in the modified dataset as compared to the block in the initial dataset, and the block not being in the initial dataset.

5. The method of claim 1, wherein the comparing comprises iteratively comparing hash values of nodes of the hash tree for the modified dataset to hash values of nodes of the hash tree for the initial dataset, wherein a match between hash values of a first node, of the hash tree for the modified dataset, and hash values of a second node, of the hash tree for the initial dataset, indicates that a set of blocks, of the modified dataset, associated with a sub-tree of the first node are unmodified as compared to a set of blocks, of the initial dataset, associated with a sub-tree of the second node, and therefore the set of blocks of the modified dataset are not updated compared to the set of blocks of the initial dataset.

6. The method of claim 5, wherein a mismatch between hash values of a third node, of the hash tree for the modified dataset, and hash values of a fourth node, of the hash tree for the initial dataset, indicates that at least one block, of the modified dataset, associated with a sub-tree of the third node is updated as compared to the initial dataset.

7. The method of claim 5, wherein each leaf node of the hash tree for the initial dataset and hash tree for the modified dataset corresponds to a respective block of the initial dataset and modified dataset, respectively.

8. The method of claim 1, further comprising obtaining, based on the executing the data processing job against the initial dataset, one or more tables storing result values of the data processing job, the result values each associated with a respective block of the initial dataset, wherein the re-executing the data processing job updates, in the one or more tables, result values associated with the one or more blocks of the modified dataset that are updated compared to initial dataset.

9. The method of claim 8, wherein the one or more tables store a respective block indicator for each result value of the results values, and wherein the result values to update based on the re-executing are identified by their respective block indicator indicating one of the one or more blocks of the modified dataset that are updated compared to initial dataset.

10. A computer system comprising:
a memory; and
a processor in communication with the memory, wherein the computer system is configured to perform a method comprising:
generating a hash tree for an initial dataset, the generating using computed hashes of records of the initial dataset, the records of the initial dataset assigned to blocks of the initial dataset;
executing a data processing job against the initial dataset, the data processing job comprising a set of calculations against data of the records of the initial dataset;
based on a modification to the initial dataset to produce a modified dataset, generating a hash tree for the modified dataset using computed hashes of records of the modified dataset, the records of the modified dataset assigned to blocks of the modified dataset;
comparing the hash tree for the initial dataset to the hash tree for the modified dataset, and identifying, based on the comparing, one or more blocks of the modified dataset that are updated compared to the initial dataset; and
re-executing the data processing job against the modified dataset, wherein the re-executing performs only those calculations, of the set of calculations, that use data of the records of the identified one or more blocks that are updated compared to the initial dataset, and does not perform other calculations, of the set of calculations, that do not use data of the records of the one or more blocks.

11. The computer system of claim 10, wherein the modification to the initial dataset comprises at least one selected from the group consisting of: an update to a record of the initial dataset, a removal of a record of the initial dataset, and an addition of a record to the initial dataset, and wherein each block of the one or more blocks is identified as updated based on at least one selected from the group consisting of: a respective record of the block having a changed data value as compared to the record in the initial dataset, a respective record appearing in the block in the initial dataset being removed from the block in the modified dataset, a respective record being added to the block in the modified dataset as compared to the block in the initial dataset, and the block not being in the initial dataset.

12. The computer system of claim 10, wherein the comparing comprises iteratively comparing hash values of nodes of the hash tree for the modified dataset to hash values of nodes of the hash tree for the initial dataset, wherein a match between hash values of a first node, of the hash tree for the modified dataset, and hash values of a second node, of the hash tree for the initial dataset, indicates that a set of blocks, of the modified dataset, associated with a sub-tree of the first node are unmodified as compared to a set of blocks, of the initial dataset, associated with a sub-tree of the second node, and therefore the set of blocks of the modified dataset are not updated compared to the set of blocks of the initial dataset.

13. The computer system of claim 12, wherein a mismatch between hash values of a third node, of the hash tree for the modified dataset, and hash values of a fourth node, of the hash tree for the initial dataset, indicates that at least one block, of the modified dataset, associated with a sub-tree of the third node is updated as compared to the initial dataset.

14. The computer system of claim 12, wherein each leaf node of the hash tree for the initial dataset and hash tree for the modified dataset corresponds to a respective block of the initial dataset and modified dataset, respectively.

15. The computer system of claim 10, wherein the method further comprises obtaining, based on the executing the data processing job against the initial dataset, one or more tables storing result values of the data processing job, the result values each associated with a respective block of the initial dataset, wherein the re-executing the data processing job updates, in the one or more tables, result values associated with the one or more blocks of the modified dataset that are updated compared to initial dataset, wherein the one or more tables store a respective block indicator for each result value of the results values, and wherein the result values to update based on the re-executing are identified by their respective block indicator indicating one of the one or more blocks of the modified dataset that are updated compared to initial dataset.

16. A computer program product comprising:
a computer readable storage medium readable by a processing circuit and storing instructions for execution by the processing circuit for performing a method comprising:
generating a hash tree for an initial dataset, the generating using computed hashes of records of the initial dataset, the records of the initial dataset assigned to blocks of the initial dataset;
executing a data processing job against the initial dataset, the data processing job comprising a set of calculations against data of the records of the initial dataset;
based on a modification to the initial dataset to produce a modified dataset, generating a hash tree for the modified dataset using computed hashes of records of the modified dataset, the records of the modified dataset assigned to blocks of the modified dataset;
comparing the hash tree for the initial dataset to the hash tree for the modified dataset, and identifying, based on the comparing, one or more blocks of the modified dataset that are updated compared to the initial dataset; and
re-executing the data processing job against the modified dataset, wherein the re-executing performs only those calculations, of the set of calculations, that use data of the records of the identified one or more blocks that are updated compared to the initial dataset, and does not perform other calculations, of the set of calculations, that do not use data of the records of the one or more blocks.

17. The computer program product of claim 16, wherein the modification to the initial dataset comprises at least one selected from the group consisting of: an update to a record of the initial dataset, a removal of a record of the initial dataset, and an addition of a record to the initial dataset, and wherein each block of the one or more blocks is identified as updated based on at least one selected from the group consisting of: a respective record of the block having a changed data value as compared to the record in the initial dataset, a respective record appearing in the block in the initial dataset being removed from the block in the modified dataset, a respective record being added to the block in the modified dataset as compared to the block in the initial dataset, and the block not being in the initial dataset.

18. The computer program product of claim 16, wherein the comparing comprises iteratively comparing hash values of nodes of the hash tree for the modified dataset to hash values of nodes of the hash tree for the initial dataset, wherein a match between hash values of a first node, of the hash tree for the modified dataset, and hash values of a second node, of the hash tree for the initial dataset, indicates that a set of blocks, of the modified dataset, associated with a sub-tree of the first node are unmodified as compared to a set of blocks, of the initial dataset, associated with a sub-tree of the second node, and therefore the set of blocks of the modified dataset are not updated compared to the set of blocks of the initial dataset.

19. The computer program product of claim 18, wherein a mismatch between hash values of a third node, of the hash tree for the modified dataset, and hash values of a fourth node, of the hash tree for the initial dataset, indicates that at least one block, of the modified dataset, associated with a sub-tree of the third node is updated as compared to the initial dataset.

20. The computer program product of claim 18, wherein each leaf node of the hash tree for the initial dataset and hash tree for the modified dataset corresponds to a respective block of the initial dataset and modified dataset, respectively.

* * * * *